Figure 3:
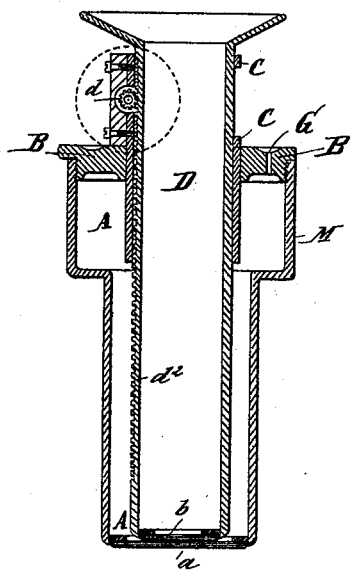

(No Model.)

E. AGLOT.
METHOD OF AND APPARATUS FOR MEASURING INGREDIENTS IN COMPOUNDS.

No. 587,254. Patented July 27, 1897.

Witnesses. Inventor.

Emile Aglot

THE NORRIS PETERS CO., PHOTO-LITHO., WASHINGTON, D. C.

UNITED STATES PATENT OFFICE.

EMILE AGLOT, OF MARSEILLES, FRANCE.

METHOD OF AND APPARATUS FOR MEASURING INGREDIENTS IN COMPOUNDS.

SPECIFICATION forming part of Letters Patent No. 587,254, dated July 27, 1897.

Application filed August 8, 1895. Serial No. 558,677. (No model.) Patented in France July 21, 1891, No. 215,006; in Belgium January 21, 1892, No. 98,013; in Italy March 30, 1892, No. 31,154/166, and in Spain December 21, 1892, No. 1,771/12,904.

*To all whom it may concern:*

Be it known that I, EMILE AGLOT, a citizen of the French Republic, residing at Marseilles, France, have invented certain new and useful Improved Methods of and Apparatus for Measuring Ingredients in Compounds, (for which I have obtained Letters Patent in France, No. 215,006, dated July 21, 1891; in Belgium, No. 98,013, dated January 21, 1892; in Spain, No. 1,771/12,904, dated December 21, 1892, and in Italy, No. 31,154/166, dated March 30, 1892,) of which the following is a specification.

It is frequently desired quickly to estimate in an approximate manner the quantity of a certain substance contained in a product. My invention consists in a method and apparatus whereby this can be effected.

If a turbid liquid arising from the precipitation of a substance is placed between a light of constant intensity and the eye the thickness of the layer of this turbid liquid necessary to intercept the view of the source of light depends on the quantity of the precipitate, and can consequently be used as a measure thereof.

If for a given substance there be established the relation between the thicknesses of such layers (hereinafter called "layer thicknesses") and the quantities (hereinafter referred to as "substance contents") of the substance contained in a given volume of the solutions of which the layers consist, it will be sufficient, for the purpose of ascertaining the quantity of this substance in any solution whatever, to determine its layer thickness by operating under the conditions that were present at the establishment of the relation. The measurement of a substance in solution is thus reduced to a precipitation and an observation.

In order that a liquid that is rendered turbid may be well suited to observation, it ought to have a sufficient degree of milkiness and to be homogeneous—*i. e.*, the substance to be measured ought to be distributed therein uniformly and in an extremely finely divided state—at least during the observation. To this end I have recourse to a thickening substance—*e. g.*, a solution of dextrine, gum-arabic, or glucose—which I mix with the solution to be observed either after or before the precipitation of the substance to be measured, according to circumstances.

The source of light the rays of which are to be directed upon the turbid liquid should be of constant intensity. For this purpose there may be employed, for example, an incandescent electric lamp of a definite illuminating power, a petroleum-lamp that has a given diameter of burner and an intensity that can be considered constant in the most highly-illuminating part, even for somewhat different heights of wick and in its entirety when the wick is made level with the edge of the burner, or any other suitable source of light.

The distance between the source of light and the nearer surface of the turbid liquid to be examined also ought to be constant. For this purpose I place the source of light at one of the ends of a dark chamber, at the other end of which the turbid liquid is placed in a suitable receptacle or apparatus which is capable of being adjusted in a stationary position—*i. e.*, at a fixed distance from the source of light.

In order to obtain and to be able to determine the thicknesses of layers of a definite turbidity that are necessary for intercepting the luminous rays on the way to the observer, I have recourse to a receptacle or apparatus of a definite capacity, in which a layer of the liquid is contained between two flat and parallel pieces of glass, which are arranged between the source of light and the eye, and one of which can be brought nearer to or removed farther from the other while the liquid in excess is removed from view. This apparatus is preferably arranged in such a manner that the pieces of glass that inclose between them the layer of turbid liquid to be observed are horizontal.

Experience has shown that the layer thicknesses obtained for given turbidities by a person with normal eyesight hold good for every person with normal eyesight, at least after some practice, and are correct also for abnormal eyesights if a lens appropriate to the eyesight of the observer be placed between the eye and the apparatus or receptacle containing the turbid liquid.

In the case of substances that give rise to only an extremely small turbidity there is interposed between the light and the receptacle of the liquid to be observed a device for weakening the rays of light—e. g., a piece of opaline glass, or a screen having made through it narrow slits covered with an oiled dioptric paper, or a combination of these. The layer thickness to be obtained is therefore the thickness that is necessary in order that the flame the intensity of which has been weakened by the piece of opaline glass or the screen may no longer be seen.

The annexed drawings represent by way of example a portable apparatus for putting this method into practice.

Figure 4:
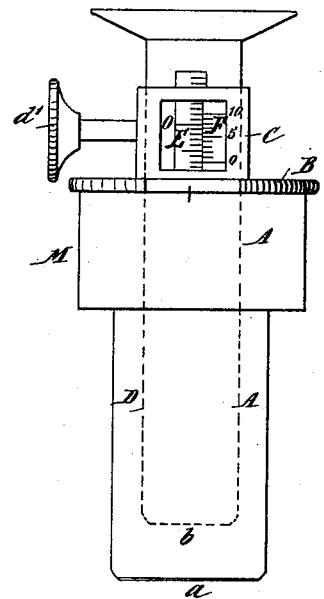
Figure 2:
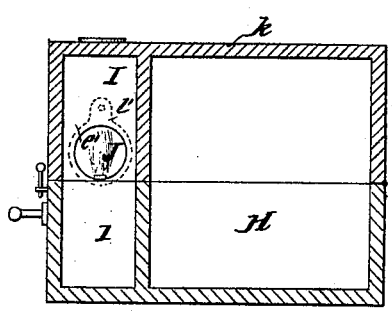
Figure 1:
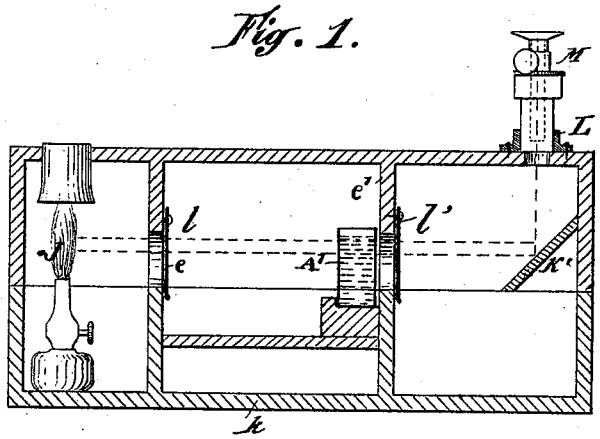

Figure 1 is a longitudinal section, and Fig. 2 a transverse section, of the apparatus. Figs. 3 and 4 represent to a larger scale, respectively, a vertical section and an elevation of the receptacle or apparatus for containing the turbid liquid that is to be observed.

K is a rectangular box divided by a longitudinal partition into two compartments I and II. The small compartment I constitutes the dark chamber that serves for the observation itself, and the compartment II may serve for containing the reagent-receptacles and the utensils.

At one end of the chamber I is placed the source of light, which consists, in the example shown, of a petroleum-lamp J. At the other end of the chamber I there is arranged a mirror, which is inclined at forty-five degrees and reflects the luminous rays upon the adjustable receptacle or apparatus or ingredient-measurer M, which is placed in a socket L.

In the compartment I there may be arranged at fixed distances from the source of light screens $e$ and $e'$, provided with openings on a level with the flame. These openings may be covered by pieces of opal glass, translucid screens, &c., which may be suspended in frames $l$ and $l'$.

Figs. 3 and 4 represent, to a larger scale, the apparatus or ingredient-measurer M for inclosing the turbid liquid to be observed. This apparatus M includes a receptacle A, comprising two freely intercommunicating cylinders which are arranged one above the other and have the same axis, but diameters of different lengths. The lower cylinder, which has the smaller diameter, is closed hermetically at its lower end by a flat piece of glass $a$, while the upper cylinder may be furnished at the top with a cover B, which may be screwed into place, reference-marks being provided on the edges of the cover and the cylinder to enable it to be ascertained when the cover is screwed home.

To the cover B is soldered a sleeve C, the axis of which coincides with that of the receptacle A. D is a tube which can be moved up and down with slight friction in this sleeve. The tube D is closed hermetically at its base by a flat piece of glass $b$ and terminates at its upper part in a bell-mouth or socket, in which may, if required, be placed a piece of colored glass or a lens appropriate to the sight of the observer. The telescopic tube D can be moved up and down by means of a pinion $d$, which is keyed on the axle of a disk $d'$ and acts on a rack $d^2$, formed in the wall of the tube D. The tube carries longitudinally a scale, divided into millimeters, which can be observed through an opening E made in the sleeve C, a longitudinal vernier F for reading to the tenth of a millimeter being provided on the said sleeve. By turning the disk $d'$ the pieces of glass $a$ and $b$ can be caused to approach and to recede from each other. The measure of their distances apart is indicated by the vernier F. The diameter and the height of the large cylinder of the receptacle A are such that that cylinder can contain the portion of the liquid that is displaced from the lower cylinder by the telescopic tube D. A vent-hole G, arranged in the cover B, allows of the escape and the reëntry of air during the motion of the tube D.

In order to measure a substance, it is necessary to have previously established the relation between layer thicknesses and substance contents by means of a liquid having a definite proportion of this substance. For this purpose there is introduced into a gaged bottle a definite volume of the liquid. Precipitation is then effected by means of a reagent in excess, and the level of the contents of the bottle is brought up to the gage-mark by adding a liquid appropriate to the operation. Agitation is now produced to effect mixture, and some of the liquid is then poured into the receptacle A, so as to fill the small cylinder. The plate B is then screwed home and the apparatus M placed into its socket L, the lamp J having been previously lighted. The telescopic tube D is then moved until the eye, applied at the eyehole, no longer perceives the flame, and note is then taken of the division of the vernier, which indicates the layer thickness corresponding to the amount of the substance contained in the liquid employed. Operations of this kind are repeated under the same conditions, except that the percentage of the substance in the liquid is varied, and there is established with the data thus obtained the relation of layer thicknesses and substance contents required. If desired, a curve may be traced to represent this relation diagrammatically. If it be required to ascertain the amount of this substance contained in a solution freed from any foreign matters that might be precipitated by the reagent, it will, if it be arranged that the conditions as regards the precipitation be the same as those under which the aforesaid relation has been established, be necessary merely to perform with a determined volume of this solution the same operation as that which has served for establishing the said relation, and by means of the layer thickness thereby obtained and the relation to calculate substance contents of the solution.

It has been found that within the limits of movement of the tube D the relations of layer thicknesses to substance contents are generally simple and correspond sufficiently approximately to the formula $xy=c$, $c$ being a constant characteristic of the precipitate under the conditions under which it has been formed. These relations may become in certain circumstances of the form $x(y+a)=c$, $a$ and $c$ being constants, and they will rarely be more complex. It will be seen, therefore, how easy and rapid is the establishment of the relations.

If the solution of the substance or of the precipitant is corrosive for the metal of the tube D, and if the precipitation and the observation are to be made in a hot liquid, it is expedient to substitute the following method for that indicated above: A rectangular or oval glass cup A' (shown in dotted lines in Fig. 1) is placed in or in front of the lamp and with its largest side against the screen $e'$. In the receptacle A there is placed any turbid liquid whatever—e. g., a liquid obtained by precipitating a solution of sulfate by a salt of baryta. Let N be the number given by the vernier when clear water has been put into the cup A', and $n$ the number when for the water there has been substituted the solution in which the substance to be measured has been precipitated. Then, as N remains the same, the variations of $n$ can serve as a measure of the substance contents.

As in the first case there is established the relation of $n$ with the substance contents of the liquid having a definite proportion of the substance, the receptacle A containing a turbid liquid having a degree of milkiness represented by N, (N being the number read off the vernier when the cup A' contains clear water,) and in order to measure the substance $n$ is determined by employing the same turbid liquid of lactescence N, from which the substance contents is obtained by the aid of the relation.

If the lactescence of the turbid liquid of the apparatus were N', by multiplying the corresponding $n'$ by $\frac{N}{N'}$ there would be obtained the $n$ that would have been given by the lactescence N. With this apparatus, too, bodies can be measured which give colored solutions when the substance contents depends on the intensity of the coloration. This intensity is measured by putting into the receptacle A some of this solution, and on the bell-mouth that terminates the telescope D a disk of glass colored with the complementary color or a liquid contained between two pieces of glass having this complementary color, and then operating the rack until there is seen neither the color of the solution nor the complementary color. The number given by the vernier will represent the intensity of the color of the solution and consequently its substance-contents if the relation between the layer-thicknesses and the substance contents have been established by means of liquids containing known percentages of the substance.

The intensity of the turbidity or the lactescence of a liquid and that of a precipitate obtained in the same volume and with the same quantities of the same substances remaining constant, the layer thicknesses necessary for intercepting the view of various sources of light or of objects illuminated by them, placed at the same distance, depend on the intensities of these sources. They may thus serve as a measure of these intensities, whence the application of my method to photometry and to pyrometry and the employment of the apparatus as a photometer and pyrometer through the establishment of the relation between the layer-thicknesses and the intensities by means of a selected unit of light placed at various distances from the illuminated object and the application of the law that connects the intensity of illumination of objects with the distances between these objects and the source of light.

What I claim is—

1. A method of rapidly measuring ingredients consisting in placing in the path of rays proceeding from a source of light of constant intensity to an observer's eye, a layer of a liquid whose ingredient is to be measured, the layer-surfaces passed through by the said rays being parallel and bringing the said layer to a thickness such that the said layer just intercepts the said rays, substantially as herein described.

2. A method of rapidly measuring ingredients consisting in placing in the path of rays proceeding from a source of light of constant intensity to an observer's eye, a layer of a liquid whose ingredient is to be measured, the layer-surfaces passed through by the said rays being parallel, weakening the said rays, as by a piece of opaline glass or a screen, before they reach the said layer, and bringing the said layer to a thickness such that the said layer just intercepts the said rays, substantially as herein described.

3. A method of rapidly measuring ingredients, consisting in directing luminous rays on a definite thickness of a liquid containing the substance to be measured, and through a layer of a turbid liquid having a determined degree of lactescence and bringing the latter layer to a thickness such that the two liquids just intercept the passage of said rays to the eye of an observer, substantially as herein described for the purpose specified.

4. A method of rapidly measuring ingredients consisting in precipitating the ingredient to be measured, putting the precipitate into suspension in the liquid that contains it, rendering the said liquid milky by adding to it a thickening substance such as a solution of dextrine, gum-arabic, or glucose, placing a layer of the mixture thus formed in the path of rays proceeding from a source of light of constant intensity to an observer's eye, the layer-surfaces passed through by the said rays being parallel, and bringing the said layer to a thickness such that the said layer just intercepts the said rays, substantially as herein described.

5. A method of rapidly measuring ingredients consisting in reflecting rays from a source of light of constant intensity placed at one end of an inclosed space, through a layer of a liquid whose ingredient is to be measured, the said layer being placed at the other end of the said space and having parallel surfaces passed through by the said rays, and bringing the said layer to a thickness such that the said layer just intercepts the said rays, substantially as herein described.

6. Measuring apparatus comprising a dark chamber, a source of light at one end of the said chamber and at the other end of the said chamber a receptacle adapted to contain a layer of liquid bounded by parallel surfaces passed through by rays from the said source, substantially as herein described and for the purposes set forth.

7. Measuring apparatus comprising a dark chamber, a source of light at one end of said chamber, at the other end of the said chamber a receptacle provided with two parallel transparent plates and adapted to contain between the said plates a layer of liquid and a screen provided with an opening passed through by rays proceeding from the said source to and through the said plates, substantially as herein described and for the purposes set forth.

8. Measuring apparatus comprising a dark chamber, a source of light at one end of said chamber, at the other end of said chamber a receptacle adapted to contain a liquid, and a screen provided with an opening closed by an opaline glass or its equivalent passed through by rays proceeding from the said source to and through the said receptacle, substantially as herein described and for the purposes specified.

9. Measuring apparatus comprising a dark chamber, a source of light, a receptacle adapted to inclose a layer of turbid liquid between two transparent horizontal surfaces, and an inclined mirror adapted to reflect luminous rays from the said source upon the said layer, substantially as herein described for the purposes set forth.

10. Measuring apparatus comprising a dark chamber, a source of light, a receptacle adapted to inclose a turbid liquid and composed of two cylinders of which one surrounds the other and of which the internal cylinder can be displaced in the direction of the axis of the external cylinder, the two cylinders being furnished at their lower ends with two parallel flat pieces of glass, substantially as herein described for the purposes set forth.

11. Measuring apparatus comprising a dark chamber, a source of light, a cylindrical vessel for inclosing a turbid liquid, a plate or cover screwed to the said vessel, a sleeve carried by the said plate or cover, a telescopic tube capable of being displaced within the said vessel and the said sleeve, parallel flat pieces of glass closing the lower ends of the said vessel and the said tube, and graduated scales on the said cylinder and the said sleeve, substantially as herein described for the purposes set forth.

12. Measuring apparatus comprising a dark chamber, a source of light, a vessel for inclosing a turbid liquid, a telescopic tube capable of being displaced within and along the axis of the said vessel, and an enlargement in the upper part of the said vessel for the reception of liquid displaced by the said telescopic tube, substantially as herein described for the purposes set forth.

13. Measuring apparatus comprising a dark chamber, a source of light, a vessel for the reception of a turbid liquid, a telescopic tube, and means for displacing the said tube in the direction of the axis of the said vessel, substantially as herein described for the purposes set forth.

14. Measuring apparatus comprising a dark chamber, a source of light, a vessel for inclosing a turbid liquid, a telescopic tube capable of being displaced within, and in the direction of the axis of the said vessel, a rack carried by said tube, a pinion gearing into the said rack, and a disk or wheel fixed on the axle of the said pinion, substantially as herein described for the purposes set forth.

15. Measuring apparatus comprising a dark chamber, a source of light, a vessel for inclosing a turbid liquid, a telescopic tube capable of being displaced within the said vessel, and an enlargement at the upper part of the said tube, substantially as described and for the purposes set forth.

16. In apparatus for measuring ingredients, the combination of a portable box, a dark compartment, a source of light of constant intensity placed at one end of said compartment, a mirror placed at the other end of the said compartment and inclined at forty-five degrees to the horizontal, an ingredient-measurer arranged opposite to the said mirror provided with two parallel transparent plates arranged to be passed through by rays from the said source, and adapted to hold a layer of liquid between the said plates, and a compartment for reagent-receptacles and utensils, substantially as herein described for the purpose set forth.

In testimony whereof I have signed this specification in the presence of two subscribing witnesses.

EMILE AGLOT.

Witnesses:
WM. H. CHAMBERS,
CHRS. P. PRESSLY.